United States Patent [19]

Sakashita et al.

[11] 4,186,234

[45] Jan. 29, 1980

[54] LIGHT TRANSMISSIBLE HIGH DENSITY ELASTIC RESIN COMPOSITION

[75] Inventors: Kazumi Sakashita, Nara; Kenji Hiratsuka, Kasugai; Yutaka Umezu, Aichi; Nobuo Nakamura, Inuyama; Haruhisa Noda, Ichinomiya, all of Japan

[73] Assignee: Dai Nippon Toryo Company, Osaka, Japan

[21] Appl. No.: 896,506

[22] Filed: Apr. 17, 1978

Related U.S. Application Data

[63] Continuation of Ser. No. 622,377, Oct. 14, 1975, abandoned.

[30] Foreign Application Priority Data

Mar. 3, 1975 [JP] Japan .................................. 50-24979

[51] Int. Cl.$^2$ .......................... B32B 5/16; C08K 7/20
[52] U.S. Cl. ..................................... 428/283; 106/297; 260/30.4 R; 260/30.4 N; 260/30.6 R; 260/31.6; 260/31.8 R; 260/31.8 N; 260/31.8 XA; 260/31.8 PQ; 260/37 N; 260/40 R; 260/42.46; 260/42.49; 260/42.52; 428/137; 428/290

[58] Field of Search .............. 260/42.49, 42.52, 40 R, 260/42.46, 37 N, 30.4 R, 30.4 N, 30.6 R, 31.6, 31.8 R, 31.8 N, 31.8 XA, 31.8 PQ; 106/297; 428/137, 290, 283

[56] References Cited

U.S. PATENT DOCUMENTS

2,311,613  2/1943  Slayler .............................. 260/42.18

FOREIGN PATENT DOCUMENTS

1044503 10/1966 United Kingdom .

OTHER PUBLICATIONS

Wake, William C., Fillers for Plastics, London, Iliffe Books, 1971, p. 119.
King, The Fundamentals of College Chemistry, 3rd Ed., American Book Co., New York, 1959, pp. 344–345.

*Primary Examiner*—James H. Derrington
*Attorney, Agent, or Firm*—Oblon, Fisher, Spivak, McClelland & Maier

[57] ABSTRACT

A translucent, high density elastic resin composition which comprises 100 wt. parts of a thermoplastic resin or a mixture of a plasticizer and a thermoplastic resin, and 100–500 wt. parts of a powdered glass having a refractive index of $N_D = 1.5$–2.2. This composition is suitable for fabricating translucent soundbarriers.

10 Claims, No Drawings

LIGHT TRANSMISSIBLE HIGH DENSITY ELASTIC RESIN COMPOSITION

This is a continuation, of application Ser. No. 622,377, filed Oct. 14, 1975 now abandoned.

BACKGROUND OF THE INVENTION

Field of Invention

The present invention relates to translucent high density, elastic resin compositions which have excellent soundbarrier properties when fabricated into sheets, plates or the like. The prior art, used lead plates or sheets of a mixture of a thermoplastic resin and a high density powdered metal such as lead, as soundbarriers. These conventional soundbarriers are of course opaque. Thus, when the prior art soundbarriers are used in a room natural light is excluded and it is necessary to use artificial lighting.

There is thus a use for soundbarriers which are translucent.

SUMMARY OF THE INVENTION

Accordingly, it is an object of this invention to provide a resin composition which may be fabricated into translucent soundbarriers.

It is another object of this invention to provide a resin composition which has excellent light transmitting properties and is capable of being fabricated into soundbarriers which possess the ability to dampen sound waves transmitted both through the air and solid bodies.

These and other objects of this invention as will hereafter become more readily apparent, may achieved by using a translucent, high density elastic resin composition having a specific gravity greater than 1.8 and which comprises 100 wt. parts of a thermoplastic resin or a mixture of a thermoplastic resin and plasticizer and 100–500 wt. parts of a powdered glass having a refractive index of $N_D = 1.5$–2.2.

DESCRIPTION OF THE PREFERRED EMBODIMENTS

In the specification, the term "translucent" includes "semi-transparent" and is not limited to transparent. The thermoplastic resins used in the invention can be polyvinylchloride, vinyl chloride-vinyl acetate copolymer, polyvinylidene chloride, polyethylene, polypropylene, polyvinyl acetate, ethylene-vinylacetate copolymer, nylon, polyester, polyurethane and the like. The degree of polymerization of the thermoplastic resin is preferably in a range of 1000–2500.

Suitable plasticizers which may be used in this invention include dibutylphthalate, dihexyl phthalate, diethylhexyl phthalate, dioctyl phthalate, disooctyl phthalate, butyloctyl phthalate, dioctyl adipate, diisooctyl adipate, didecyl adipate, diethylhexyl adipate, diethylhexyl azelate, diisooctyl azelate, tricresyl phosphate, diethyleneglycol dipelargonate, epoxy type plasticizer and the like. The plasticizer is added to the resin e.g. polyvinyl chloride, to impart softness. The amount of the plasticizer is preferably in a range of 50–150 wt. parts to 100 wt. parts of polyvinyl chloride or the like.

The powdered glass used in the invention can be optical glass powder, soda-lime glass powder, lead glass powder, crystal glass powder, lead silicate powder, boron silicate glass, or the like. In particular, optical glass powder, lead glass powder, and crystal glass powder are preferred because of the high specific gravity of these glass powders.

The amount of the powdered glass in the composition is from 100 to 500 wt. parts per 100 wt. parts of the thermoplastic resin or the mixture of the thermoplastic resin and the plasticizer, so as to prepare the resin composition having a specific gravity of higher than 1.8. When the amount of the powdered glass in the composition is less than 100 wt. per 100 wt. parts of thermoplastic resin or the mixture of thermoplastic resin and plasticizer, the specific gravity of the resin composition is too low and thus, the final product does not possess satisfactoy soundbarrier properties. On the other hand, when the amount of the powdered glass in the composition is more than 500 wt. parts, the physical properties, in particular the tensile strength, of the resin composition are not satisfactory. Thus, it is preferred to combine 300–400 wt. parts of the powdered glass per 100 wt. parts of the thermoplastic resin or the mixture of the thermoplastic resin and the plasticizer.

The refractive index of the powdery glass is preferably near that of the thermoplastic resin used in the invention. The difference in the refractive index of the powdered glass to that of the resin composition is preferably in a range of 0–0.8 ($N_D$). The refractive index of the thermoplastic resin is usually in a range of 1.4–1.6 ($N_D$). Accordingly, it is preferred to use powdered glasses having a refractive index of 1.5–2.2 ($N_D$) especially, 1.5–1.8 ($N_D$). When a powdered glass having a high refractive index, more than 2.2 is used, the central refractive luminance of the powdered glass is too high and the light transmitting capability of the resin composition is decreased.

The preferred shape of the powdered glass used in the invention is spherical or the like i.e. beads, because spherical particles of the glass possess the lens-like property of increasing light transmittance. The average diameter of the powdered glass used is preferably in the range of 20–150 microns, especially 40–120 microns. When the average diameter of the powdered glass is less than 20 microns, the amount of light transmitted is decreased because of excessive diffusion. On the other hand, when the average diameter is greater than 150 microns, the physical properties, such as tensile strength of the resin composition are decreased. Thus, the average diameter of the powdered glass is preferably 40–120 microns. The specific gravity of the powdered glass is usually greater than 2.4, preferably greater than 3.0 so as to increase the density of the resin composition to improve the soundbarrier properties. The specific gravity selected depends upon the ratio of the powder glass to thermoplastic resin or thermoplastic resin and plasticizer.

It is possible to add a transparent pigment, a dye, a stabilizer, a lubricant, parting agent, etc. to the resin composition of the invention, if desired. If a stabilizer is added it should be transparent like epoxy vegetable oils, Cd-Ba-Zn type organic composites, organotin compounds and the like.

Sheets of the resin composition of this invention can be prepared by dispersing the powdered glass in the thermoplastic resin or thermoplastic resin and plasticizer using an extruder, a hot-kneader, a hot-roller mill or the like and then, pelletizing it and forming sheets with a calender roller, an extruder or the like. Sheets of the resin composition can be also prepared by means of a hot-roller mill to directly form the sheets by kneading to disperse the powdered glass in the thermoplastic resin or thermoplastic resin and plasticizer and extruding the mixture to form the sheet. The resulting sheets are used as translucent soundbarriers.

Sheets made of the resin composition of this invention preferably have a thickness of 0.4–2 mm, a specific gravity of more than 1.8, a total light transmittance of more than 10%, a tensile strength of more than 30 Kg/cm$^2$ and are used as soundbarriers. It is preferred to reinforce sheets made of the resin composition of this invention with a split film of nonwoven fabric prepared by stretching a film of a thermoplastic resin such as polyethylene, polypropylene, etc. to form split fibers with fine cracks having lengths of 0.1–0.3 mm in the stretched direction and laminating the sheets in the transverse and longitudinal directions, with hot-melt bonding. The sheets made from the resin composition of this invention can be used as soundbarrier curtains, accordion type doors and the like, in sick-rooms and consultation rooms in hospitals, lecture rooms in schools, living rooms, the work areas of a factories and the like. The sheets can be also used as a X-ray shield boards.

Having generally described the invention, a more complete understanding can be obtained by reference to certain specific examples, which are included for purposes of illustration only and are not intended to be limiting unless otherwise specified.

In the examples the term of "part" designates "part by weight."

EXAMPLE 1

First, 100 parts of polyvinyl chloride (Degree of polymerization 1000) was admixed with 30 parts of plasticizer of dioctyl phthalate and 20 parts of dioctyl adipate and a small amount of epoxy vegetable oil (Eposizer W-100-EL manufactured by Dainippon Ink Chemical Kabushiki Kaisha) and Cd-Ba-Zn type organic stabilizer. The mixture was kneaded at 100° C. for 1 hour. Next, 450 parts of glass beads (specific gravity of 4.8; refractive index of 1.8; average diameter of 70 microns) were added and the mixture kneaded in a continuous kneader at 160° C. for about 2 minutes, then extruded through a die opening having a diameter of 3 mm and cut to form pellets. The pellets were kneaded in a mixing roller mill at 160° C. so as to extrud a sheet having a thickness of 1 mm.

The glass beads used were UB-46J manufactured by Union Glass Co. and will be referred as glass beads A.

EXAMPLES 2–7

The process of Example 1 was repeated except using the components shown in Table to prepare each high density sheet. The properties of the resulting sheets are shown in Table.

TABLE 1

| Example | 1 | 2 | 3 | 4 | 5 | 6 | 7 |
|---|---|---|---|---|---|---|---|
| Composition: | | | | | | | |
| polyvinyl chloride (DP 1000) | 100 | | | | | | |
| polyvinyl chloride (DP 2500) | | 100 | 100 | 100 | 100 | 100 | 100 |
| plasticizer (DOP) | 30 | 30 | 30 | 30 | 30 | 30 | 30 |
| plasticizer (DOA) | 20 | 20 | 20 | 20 | 20 | 40 | 20 |
| stabilizer | 5 | 5 | 5 | 5 | 5 | 5 | |
| glass beads A | 450 | 450 | 750 | | | 600 | |
| glass beads B (*1) | | | | 450 | | | |
| glass beads C (*2) | | | | | 450 | | |
| glass beads D (*3) | | | | | | | 450 |
| Specific gravity (*4) | 2.5 | 2.5 | 3.1 | 2.3 | 2.3 | 2.9 | 2.3 |
| Tensile strength (Kg/cm$^2$) (*5) | 51 | 52 | 48 | 95 | 40 | 45 | 85 |
| Elongation (%) (*6) | 120 | 180 | 120 | 190 | 170 | 230 | 180 |
| Total light transmission (%) (*7) | 16 | 15 | 12 | 10 | 10 | 17 | 8 |
| Sound wave transmission loss 1000 Hz) (*8) | 17 | 18 | 21 | 17 | 17 | 20 | 17 |

Note:
(*1) UB-24H manufactured by Union Glass Co. (specific gravity 4.8; refractive index 2.2; average diameter 50μ)
(*2) UB-78H manufactured by Union Glass Co. (specific gravity 4.8; refractive index 2.2; average diameter 110μ)
(*3) Amorphous glass (specific gravity 4.0; refractive index 2.0; average diameter 90μ)
(*4) Japanese Industrial Standard K-6911-5.28
(*6) ASTM-D-638-68
(*7) Hitachi 323 type automatic spectrophotometer (340–700 mμ)
(*8) Japanese Industrial Standard C-1502

EXAMPLE 8

First, 100 parts of ethylene-vinylacetate copolymer (EVATATE K-2010 manufactured by Sumitomo Kaguku K.K.) was admixed with 0.5 part of zinc stearate. Next, 500 parts of Glass beads A were added and the mixture kneaded in a continuous kneader at 100–110° C., with a retention time in the kneader of more than 2 minutes, then extruded through a die opening having a diameter of 3 mm and cut to form pellets. The pellets were kneaded in a mixing roller mill at 100–110° C. so as to extrude a sheet having a thickness of 1 mm. The sheet had a specific gravity of 2.6; a tensile strength of 37 Kg/cm$^2$; an elongation of 817%; a total light transmission of 14% and a sound wave transmission loss (1000 H$_Z$) of 18.

EXAMPLE 9

First, 100 parts of vinylchloride-ethylene-vinylacetate copolymer (SUMIGRAFT GF Sumitomo Kagaku K.K.) was admixed with 0.5 part of zinc stearate. Next, 500 parts of Glass beads A were added and the mixture kneaded in a continuous kneader at 90–100° C. with a retention time in the kneader of more than 2 minutes then extruded through a die opening having a diameter of 3 mm and cut to form pellets. The pellets were kneaded in a mixing roller mill at 90°–100° C. so as to extrude a sheet having a thickness of 1 mm. The sheet had a specific gravity of 3.0; a tensile strength of 32 Kg/cm$^2$, an elongation of 307%; a total light transmission of 10% and a sound wave transmission loss (100 H$_Z$) of 20.

Having now fully described the invention, it will be apparent to one of ordinary skill in the art that many changes and modifications can be made thereto without departing from the spirit or scope of the invention as set forth herein.

What is claimed as new and intended to be covered by Letters Patent is:

1. A light transmissible, high density elastic resin composition having a specific gravity greater than 1.8 and which is a sound barrier, which comprises:
   100 wt. parts of a thermoplastic resin or a mixture of a thermoplastic resin and a plasticizer and
   100 to 500 wt. parts of a spherical lead glass having an average diameter of 40 to 120 μm and a refractive index N$_D$ of 1.5 to 2.2.

2. The light transmissible, high density elastic resin composition of claim 1, wherein the specific gravity of the lead glass is greater than 2.4.

3. The light transmissible, high density elastic resin composition of claim 2, wherein the specific gravity of the lead glass is greater than 3.0.

4. The light transmissible, high density elastic resin composition of claim 1, wherein said thermoplastic resin is polyvinylchloride, vinylchloride-vinylacetate copolymer, polyvinylidene chloride, polyethylene, polypropylene, polyvinylacetate, ethylene-vinylacetate copolymer, nylon, a polyester, or a polyurethane.

5. The light transmissible, high density elastic resin composition of claim 4, wherein said thermoplastic resin has a degree of polymerization of 1000–2500.

6. The light transmissible, high density elastic resin composition of claim 1, wherein said plasticizer is present in said composition in an amount of 50–150 parts by weight to 100 parts by weight of said resin.

7. The light transmissible, high density elastic resin composition of claim 1, wherein the difference between the refractive index of the powdered glass and that of the thermoplastic resin or the mixture of the thermoplastic resin and a plasticizer is in a range of 0–0.8 (N$_D$).

8. A sheet of the light transmissible, high density elastic resin composition of claim 1.

9. A sheet of the light transmissible, high density elastic resin composition of claim 7 reinforced with a nonwoven fabric.

10. A sheet of the light transmissible, high density resin composition of claim 3.

* * * * *